United States Patent
Kron et al.

(10) Patent No.: US 10,845,234 B2
(45) Date of Patent: Nov. 24, 2020

(54) WEIGHT MEASUREMENT SYSTEMS AND METHODS FOR USE IN TEXTILE MANUFACTURING OPERATIONS

(71) Applicant: NIKE, Inc., Beaverton, OR (US)

(72) Inventors: Brett Kron, Portland, OR (US); Karen Lawson, Hillsboro, OR (US)

(73) Assignee: NIKE, Inc., Beaverton, OR (US)

( * ) Notice: Subject to any disclaimer, the term of this patent is extended or adjusted under 35 U.S.C. 154(b) by 214 days.

(21) Appl. No.: 16/062,267

(22) PCT Filed: Dec. 15, 2016

(86) PCT No.: PCT/US2016/066929
§ 371 (c)(1),
(2) Date: Jun. 14, 2018

(87) PCT Pub. No.: WO2017/106499
PCT Pub. Date: Jun. 22, 2017

(65) Prior Publication Data
US 2019/0049286 A1 Feb. 14, 2019

Related U.S. Application Data

(60) Provisional application No. 62/268,808, filed on Dec. 17, 2015.

(51) Int. Cl.
*G01G 17/02* (2006.01)
*G01G 3/14* (2006.01)
*G01G 21/28* (2006.01)

(52) U.S. Cl.
CPC ............ *G01G 17/02* (2013.01); *G01G 21/28* (2013.01); *G01G 3/14* (2013.01)

(58) Field of Classification Search
CPC .......... G01G 3/14; G01G 17/02; G01G 21/28; G01G 21/23
See application file for complete search history.

(56) References Cited

U.S. PATENT DOCUMENTS

| 2,147,197 A | 2/1939 | Glidden |
| 3,925,912 A | 12/1975 | Martineau |

(Continued)

FOREIGN PATENT DOCUMENTS

| CN | 1425088 A | 6/2003 |
| CN | 201 532 241 U | 7/2010 |
| WO | WO 2001/048288 A1 | 7/2001 |

OTHER PUBLICATIONS

International Search Report and Written Opinion of International Search Authority for International PCT Application No. PCT/US2016/066929, dated Feb. 21, 2017 (5 pages).

(Continued)

*Primary Examiner* — Randy W Gibson
(74) *Attorney, Agent, or Firm* — Brinks Gilson & Lione

(57) ABSTRACT

In one aspect, a method of measuring the weight of material used during a textile manufacturing process comprises positioning material used during the textile manufacturing process on a receiving surface associated with a load cell. A first weight of the material may be measured using the load cell. A textile manufacturing machine may be operated such that at least a portion of the material is used in the process, wherein the material remains disposed on the receiving surface during the process. A second weight of the material may be measured using the load cell.

10 Claims, 8 Drawing Sheets

(56) References Cited

U.S. PATENT DOCUMENTS

| | | | | |
|---|---|---|---|---|
| 5,359,153 | A * | 10/1994 | Herrmann | G01G 21/22 |
| | | | | 177/126 |
| 5,504,278 | A * | 4/1996 | Deters | B65H 63/00 |
| | | | | 177/145 |
| 6,320,142 | B1 * | 11/2001 | Burton | G01G 21/23 |
| | | | | 177/126 |
| 7,214,893 | B2 * | 5/2007 | Sikula | G01G 21/23 |
| | | | | 177/238 |
| 8,899,079 | B2 | 12/2014 | Meir et al. | |
| 9,188,476 | B2 * | 11/2015 | Volker | B01D 61/04 |
| 9,612,150 | B2 * | 4/2017 | Perrea | G01G 21/23 |
| 2002/0020078 | A1 | 2/2002 | Bressoux et al. | |
| 2004/0035613 | A1 * | 2/2004 | Wolfe | G01G 21/28 |
| | | | | 177/144 |
| 2004/0244226 | A1 | 12/2004 | Farys et al. | |
| 2010/0181120 | A1 * | 7/2010 | Lo | G01G 21/22 |
| | | | | 177/253 |
| 2011/0185592 | A1 | 8/2011 | Nishiwaki et al. | |
| 2012/0233882 | A1 | 9/2012 | Huffa et al. | |

OTHER PUBLICATIONS

Examination Report for European Patent Application No. 14753354, dated Dec. 6, 2018, 5 pages.
Office Action for corresponding Chinese Patent Application No. 2016800736510, dated Mar. 11, 2020, 15 pages.
International Preliminary Report on Patentability for PCT/US2016/066929, dated Jun. 28, 2018, 7 pages.

* cited by examiner

WEIGHT MEASUREMENT SYSTEMS AND METHODS FOR USE IN TEXTILE MANUFACTURING OPERATIONS

RELATED APPLICATIONS

This application claims the benefit under 35 U.S.C. § 371 of the filing date of International Patent Application PCT/US2016/066929, having an international filing date of Dec. 15, 2016, which claims the benefit of and priority to U.S. Provisional Application No. 62/268,808, filed on Dec. 17, 2015, both of which are incorporated by reference herein in their entirety.

BACKGROUND

1. Technical Field

The present invention relates to systems and methods for measuring the weight of material used during textile manufacturing operations.

2. Background Information

Textile manufacturing operations may be used to make a variety of articles, such as clothing, footwear, accessories, and other goods. Such operations may include, by way of example and without limitation, processes performed by weaving, knitting, felting, or other techniques.

These operations utilize various types of material, such as yarn. Therefore, machines used to make such articles may include, especially for commercial use, several spools of yarn, yarn cones or bobbins to accommodate the variety of yarn used to make the articles. Other factors, such as the pattern of the article, or business objectives, such as to increase productivity in making the article, may require the machines to accommodate several spools of yarn, yarn cones or bobbins and a variety of yarn.

Yarn cones are regularly purchased by weight, yet the amount of yarn that is used for such articles is measured in length. The length of yarn may vary based on the temperature and humidity of the air where the textile manufacturing machine is located. For example, under certain temperature and humidity conditions, yarn may shrink or stretch, which affects the length measurement of the amount of yarn used. As the length of the yarn varies, the density or linear density of the yarn may provide an inaccurate estimate regarding the weight of the yarn used, as the calculation does not take into account the temperature and humidity conditions. Purchasers of yarn therefore often have difficulty accurately identifying the amount of yarn necessary to purchase for a given article or the amount of yarn used to make an article, which leads to the purchase of too much or too little yarn and yarn surplus and waste.

BRIEF SUMMARY

In one aspect, a method of measuring the weight of material used during a textile manufacturing process comprises positioning material used during the textile manufacturing process on a receiving surface associated with a load cell. A first weight of the material may be measured using the load cell. A textile manufacturing machine may be operated such that at least a portion of the material is used in the process, wherein the material remains disposed on the receiving surface during the process. A second weight of the material may be measured using the load cell.

In another aspect, a system comprises a first segment adapted to be stably positioned relative to a textile machine. A block may be coupled to the first segment. A load cell comprises a first end portion and a second end portion, wherein the first end portion of the load cell may be coupled to the block. A receiving surface may be associated with the load cell. The receiving surface may be adapted to receive the material to be used during the textile manufacturing process, and the receiving surface may be positioned at a location enabling the material to be weighed by the load cell during the textile manufacturing process In another aspect, a system comprises a first segment adapted to be stably positioned relative to a textile machine. A load cell may be coupled to the first segment. A receiving surface may be adapted to receive the material to be used during the textile manufacturing process. The receiving surface may be positioned at a location enabling the material to be weighed by the load cell during the textile manufacturing process The accompany drawings, which are incorporated herein and constitute part of this specification, and, together with the general description given above and the detailed description given below, serve to explain features of the present invention.

DETAILED DESCRIPTION OF THE DRAWINGS AND THE PRESENTLY PREFERRED EMBODIMENTS

Figure 1:
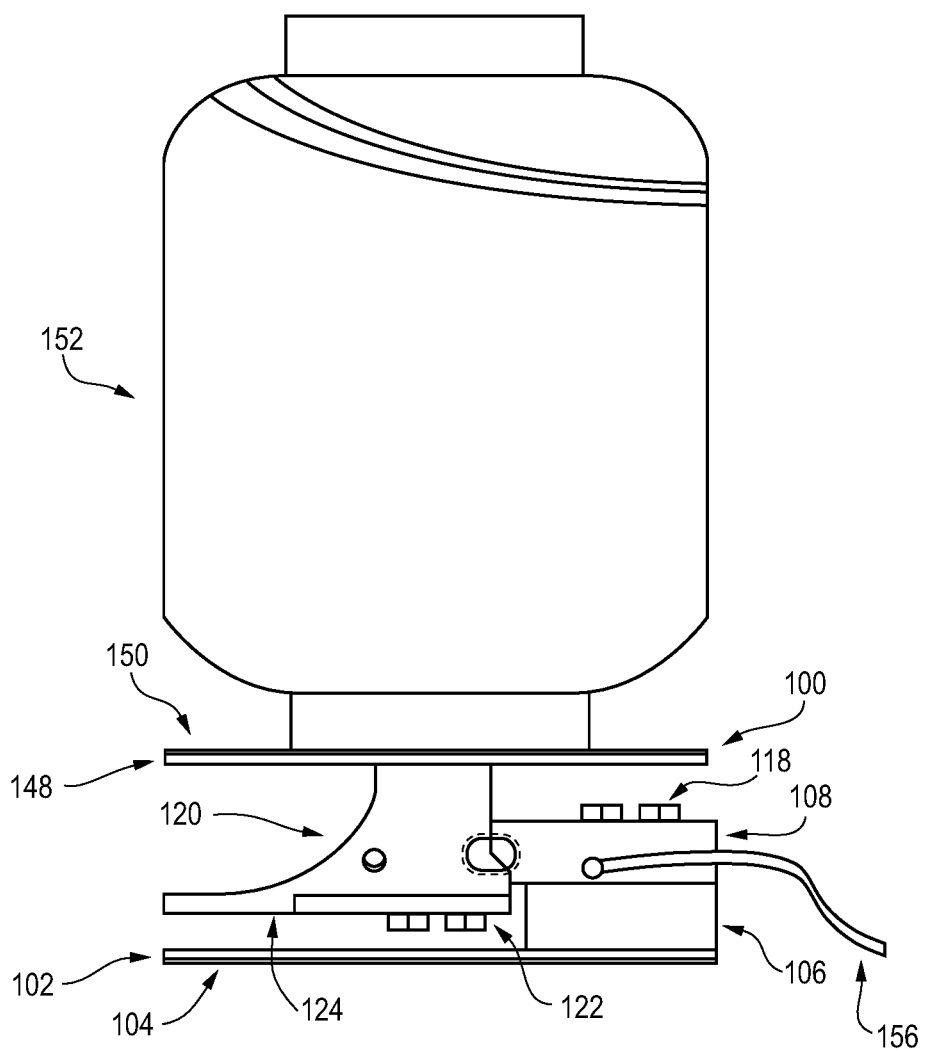
FIG. 1 shows a side view of an embodiment of an exemplary weight measurement system.
Figure 2:
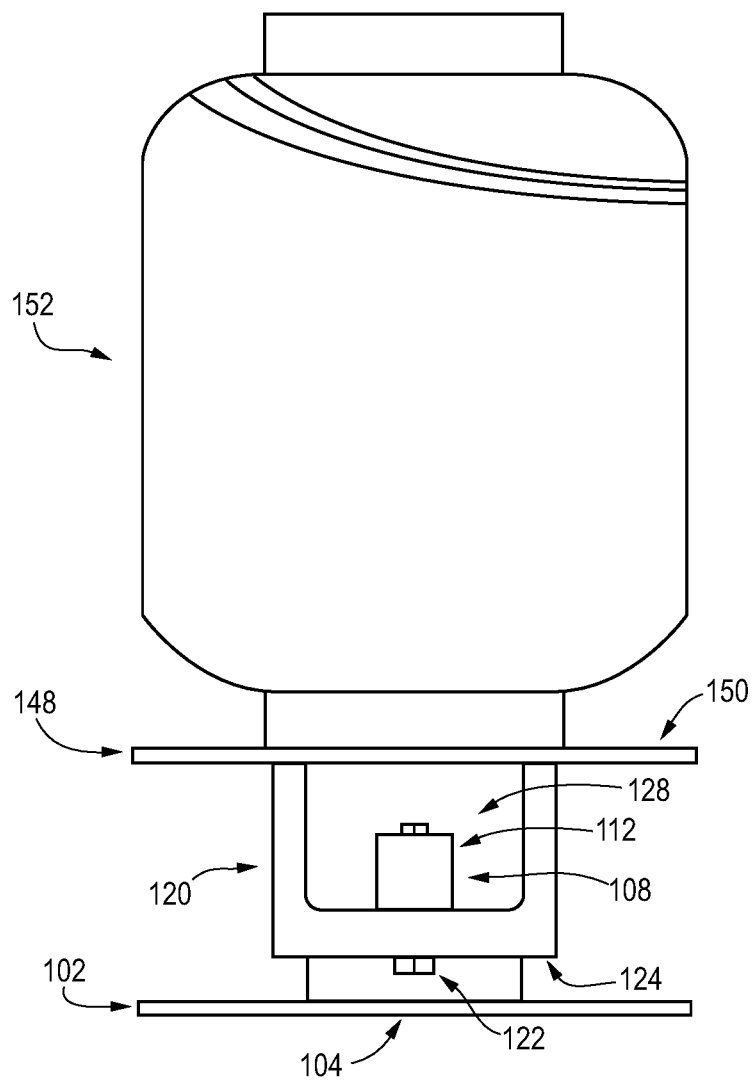
FIG. 2 shows a front view of the weight measurement system of FIG. 1.
Figure 3:
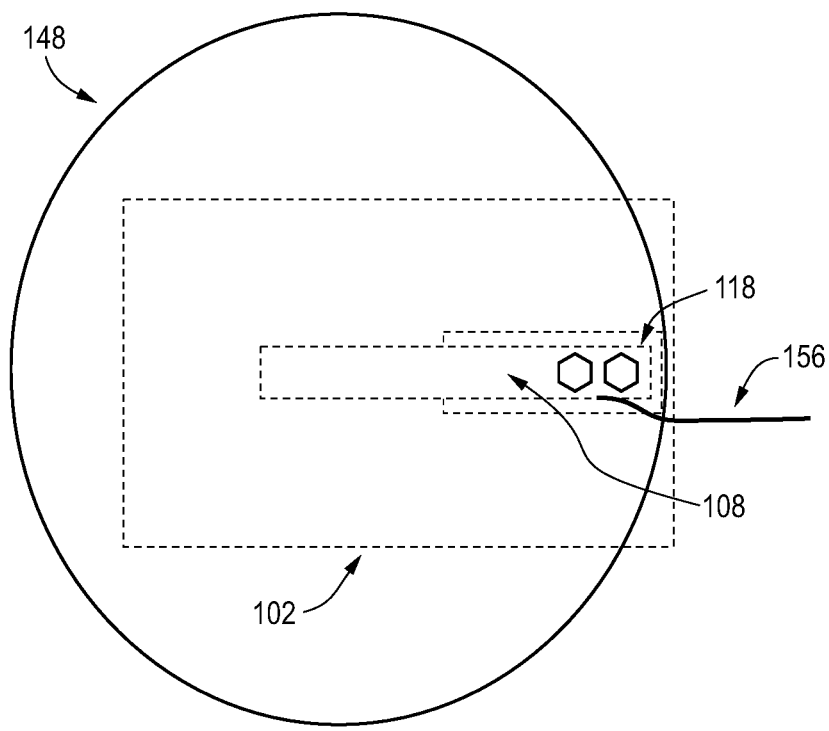
FIG. 3 shows a top view of the weight measurement system of FIG. 1.

FIGS. 1-5 show a system 100 for measuring the weight of material used in a textile manufacturing operation. The system 100 may be positioned on a supportive surface, including on a portion of a textile manufacturing machine. In one embodiment, the system 100 includes a first segment adapted to be stably positioned relative to a textile manufacturing machine. In one example, the first segment comprises a first plate 102 that may be positioned on a flat surface. The first plate 102 includes a shape, such as an exemplary rectangular shape as shown in FIG. 3. The material of the first plate 102 may vary, and may include steel, metal, an alloy of the same, or another suitable material. The first plate 102 may also include a friction pad 104 that is coupled to the bottom of the first plate 102. The friction pad 104 may be adhesively secured to the first plate 102 and minimizes movement of the first plate 102 along the supportive surface. The shape of the friction pad 104 may conform to the shape of the first plate 102.

The system 100 may also include a block 106 that is positioned over the top of the first plate 102 and connected to the first plate 102. The block 106 may be adhesively connected to the first plate 102 or mechanically connected to the first plate 102 through screws, fasteners, bolts, nuts, clamping, or other means of mechanical securement. The material of the block 106 may be the same or different than the material of the first plate 102. The block 106 provides for an elevated surface and stable foundation for placement of one segment of a load cell 108, as explained further below.

As used in the present embodiments, the term "load cell" encompasses a weight measuring component of the system 100. Usage of "load cell" in this application may include conventional types of load cells, or other components capable of measuring weight, in accordance with the principles herein. In short, references to load cell are intended to cover any such weight measurement devices.

Figure 5:
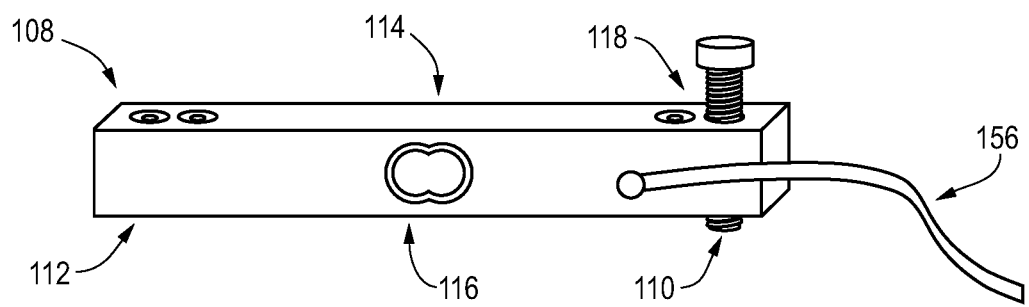
FIG. 5 shows a perspective view of an exemplary load cell of the weight measurement system of FIG. 1.

The load cell 108 of the system 100, as shown in FIG. 5, may be a transducer that is used to convert force, or the mechanical deformation, into an electrical output. The load cell 108 described herein may comprise a type of strain gauge load cell in the form of a beam; however, the disclosure herein is not limited to beam type strain gauge load cells. Load cells, including bending or shear beam, single point, S-beam or Z-beam, load button, ring, pancake or low profile, or canister load cells may be used. If a compression type load cell is used, the block 106 may not be necessary to provide an elevated surface for the load cell and can be removed. Pneumatic and helical load cells may also be used. As noted, still other weight measurement devices may be used without departing from the present embodiments.

The load cell 108 may include a generally linear shape with a first end portion 110, a second end portion 112, a top 114, and a bottom 116, as shown in FIG. 5. The first end portion 110 may be mounted to the block 106 with one or more coupling elements, such as screws or bolts 118. The one or more coupling elements 118 may be inserted through the top 114 and then through the bottom 116 of the load cell 108 for connection with the block 106.

In other embodiments, the block 106 may be omitted, or both the block 106 and the first plate 102 may be omitted. In the latter embodiment, an integral first segment of the load cell is adapted to be stably positioned relative to a textile machine. Therefore, the first segment may refer to the first segment of the load cell itself with the first plate 102 being omitted or the first segment may refer to the first plate 102 that is generally external to the load cell. In either embodiment, the first segment is adapted to be stably positioned relative to a textile machine during a manufacturing process.

The second end portion 112 of the load cell 108 may be positioned at least partially within a housing 120. If a compression type load cell is used, the housing 120 may not be necessary to mount the load cell and can be removed. The second end portion 112 may be connected to the housing 120 with one or more coupling elements, such as screws or bolts 122. The one or more coupling elements 122 may be inserted through a base 124 of the housing 120 and then through the bottom 116 of the load cell 108.

Figure 4:
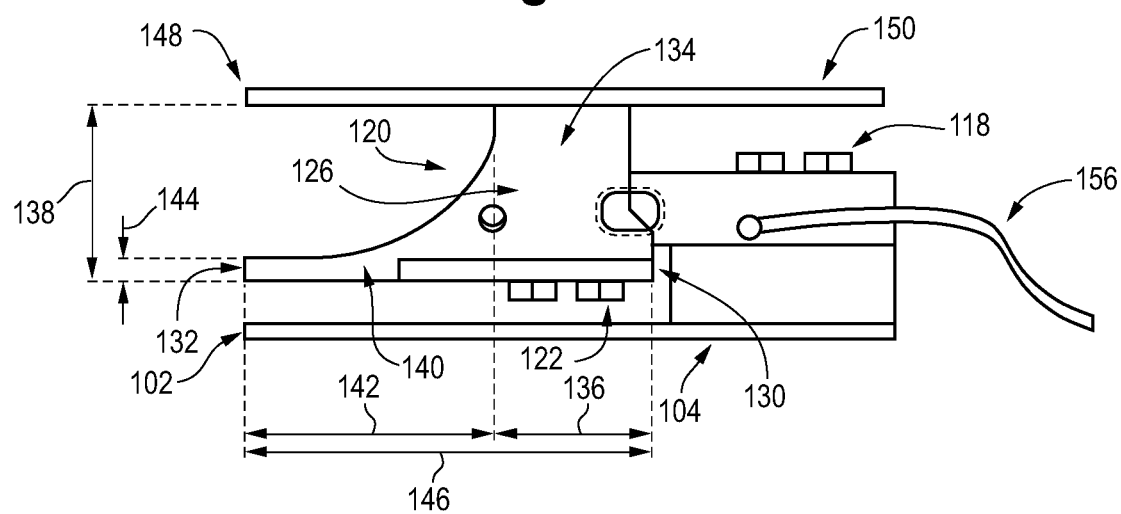
FIG. 4 shows a side view of the weight measurement system of FIG. 1.

As best seen in FIGS. 2 and 4, in one embodiment, the housing 120 may include the base 124, at least two side panels 126, a cavity 128, a first end 130, and a second end 132. The second end portion 112 of the load cell 108 may be inserted into the first end 130 of the housing 120 and positioned within the cavity 128. Each of the at least two side panels 126 includes two sections as shown in FIG. 4. A first section 134 comprises a first length 136 and a first height 138, and a second section 140 comprises a second length 142 and extends from the first height 138 of the first section 134 and tapers toward the base 124 of the housing 120 to a second height 144 smaller than the first height 138. The first length 136 and the second length 142 collectively form the total length 146 of each of the side panels 126.

The system 100 may also include a receiving surface adapted to receive the material used during the textile manufacturing process. The receiving surface may be positioned at a location suitable for the material to be weighed by the load cell 108. In some embodiments, the receiving surface may be part of the load cell 108 itself, e.g., the material to be weighed may rest directly on the load cell. In other embodiments, the receiving surface may comprise a distinct component that is coupled to the load cell 108.

In one example, a distinct receiving surface comprises a second plate 148 that may be positioned over the first sections 134 of the side panels 126 of the housing 120 as shown in FIGS. 1 and 4. In one embodiment, the second plate 148 may include a circular shape as shown in FIG. 3. The material of the second plate 148 may vary, and may include steel, metal, an alloy of the same, or another suitable material. The second plate 148 may also be coupled to a friction pad 150 that is disposed on the top of the second plate 148. The friction pad 150 may be adhesively secured to the second plate 148. The shape of the friction pad 150 may conform to the shape of the second plate 148.

It will be appreciated that while the first segment and the receiving surface are referred to in certain examples herein as "first plate 102" and "second plate 148," respectively, such descriptions are for aiding discussion and it is contemplated that the first segment and the receiving surface need not comprise "plate" shapes. Rather, other suitable non-plate shapes may be used for the first segment and the receiving surface.

A yarn cone 152 may be positioned on the friction pad 150. The yarn cone 152 may comprise a circular base, and the second plate 148 and the friction pad 150 may include a circular shape to adapt to the yarn cone 152. The friction pad 150 helps to minimize movement of the yarn cone 152 from the second plate 148 as material is removed during the manufacturing process. It will be understood that while reference is made to a yarn cone, that such a cone may support or house materials other than yarn including thread, monofilament or multifilament, and woven materials. In another embodiment, a bobbin may be used rather than a yarn cone 152 with yarn disposed around the bobbin. A bobbin may include a reel, spindle, spool or cylinder that yarn, thread, woven or other materials may be wound around.

In one embodiment, the second plate 148 may also include or be coupled to a shaft, rod, pole or other cylindrical element (not shown) that is positioned generally perpendicular to the second plate 148. The supportive cone of the yarn cone 152 or the bobbin may include a hollow center, and the yarn cone 152 or the bobbin may be positioned over the cylindrical element to minimize movement of the yarn cone 152 or the bobbin along or around the second plate 148 during the manufacturing process.

As noted above, the material to be measured by the load cell 108, such as the yarn cone 152, may be mounted or positioned on the load cell 108, and the system 100 may not include the second plate 148 and/or the friction pad 150. When the second plate 148 is not used, the load cell 108 may comprise one of the types of load cells as previously described, including but not limited to a load button, ring, pancake low profile or other compression type load cell.

In accordance with one aspect, the weight of the yarn cone 152 may be measured by the load cell 108. In one embodiment, the weight of the yarn cone may be measured as the actual weight of the supportive cone itself plus the weight of any material disposed on the supportive cone at a given time, which collectively amounts to the weight of the yarn cone. In another embodiment, the weight of the yarn cone may be measured as only the weight of the material disposed on the supportive cone, if the weight of the supportive cone itself (absent material) is known and can be excluded from the measurement. In either instance, measurements regarding the weight of the yarn cone can be taken at different points in time to calculate the weight of material coming off of the yarn cone between reference times, as will be explained further below.

When the yarn cone 152 is initially placed on the friction pad 150 of the second plate 148, the force or load from the yarn cone 152, based on the weight of the yarn cone 152, is applied to the housing 120 and the second end portion 112 of the load cell 108. When a strain gauge load cell is used, the stress applied to the load cell 108 causes the load cell 108 to deflect or deform and thus causes strain on the load cell 108 and the strain gauges of the load cell 108. The strain on the strain gauges of the load cell 108 leads to a change in resistance in the strain gauges and a change in output voltage that is proportional to the weight of the yarn cone 152. When no load is applied, the voltage output is zero or very close to zero. Based on the characteristics of the load cell 108, such as the excitation voltage, maximum weight capacity, and sensitivity, the load cell 108 can convert the voltage output into the weight of the yarn cone 152. After a manufacturing process, benchmark or desired interval has been completed, the load cell 108 can again measure the weight of the yarn cone 152 to determine how much yarn based on weight was used for the article.

The strain gauges may be adhesively adhered or otherwise mounted on the body of the load cell 108. The load cell 108 may include four strain gauges in a Wheatstone bridge configuration. However, one or two strain gauges may also be used. When a strain gauge load cell is used for the load cell 108, the load cell 108 provides off-center loading compensation that allows the load cell 108 to still accurately measure the weight of the yarn cone 152 even if the yarn cone 152 moves on the friction pad 150 of the second plate 148 away from the center of the second plate 148.

Figure 6:
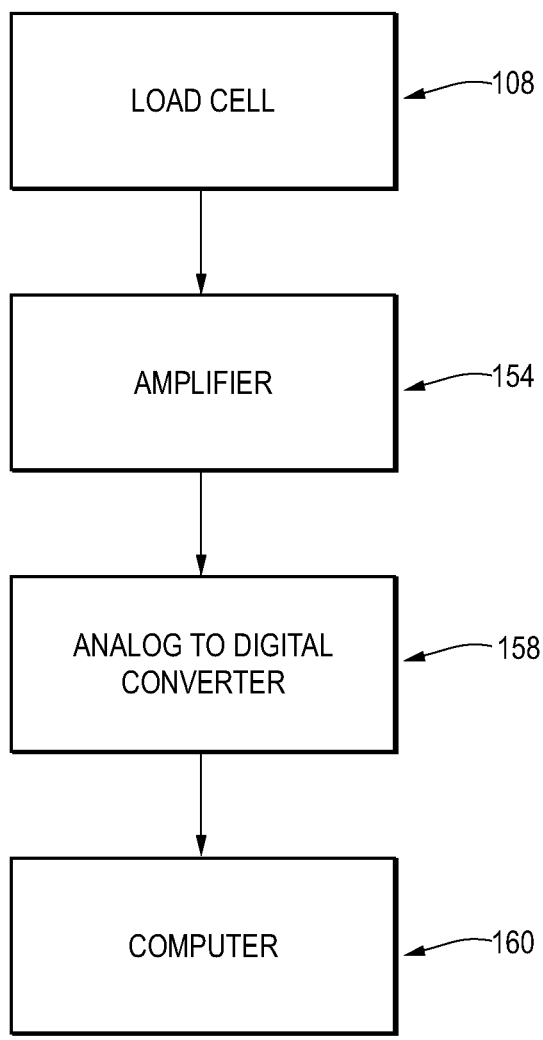
FIG. 6 shows a schematic of a block diagram for various exemplary aspects of the weight measurement system.

Referring to FIG. 6, a block diagram of various exemplary aspects of the weight measurement system is shown. The voltage output of the load cell 108 may not be large enough to be measured accurately and may be in millivolts. Therefore, an amplifier 154 may be used to amplify the signal a shown in FIG. 6. The amplifier 154 may be coupled to the load cell 108 via the wires or electrical cables 156 of the load cell 108. The amplifier 154 may be coupled to an analog to digital converter 158, and the amplified signal may then be input into the analog to digital converter 158. The analog to digital converter 158 may be coupled to the amplifier 154 via a series of wires or electrical cables. The analog to digital converter 158 allows the signal to be received by a computer 160. The analog to digital converter 158 may be coupled to the computer 158 wirelessly or via electrical connection, such as a USB cord or an Ethernet cable.

The temperature of the ambient room, or general location where the textile manufacturing machine is situated, may affect the temperature of the load cell 108 and thus the output of the load cell 108. Temperature effects can be compensated for in strain gauge measurements through software, thermistors on the strain gauges, temperature-compensating resistors, or manually. A temperature and humidity logger may also be used to identify the temperature and humidity at a given time in order to compensate for the temperature effects.

The computer 160 may include software that continuously logs and stores the weight of the yarn cone 152 or measures the weight of the yarn cone 152 at certain times, such as the weight of the yarn cone 152 before the manufacturing begins and the weight of the yarn cone 152 after the manufacturing of an article is completed. For example, the software may measure the date and time the measurement is taken, the weight of the yarn cone 152 at that time, and also the temperature and humidity of the ambient air at the time the weight is measured.

Figure 7:
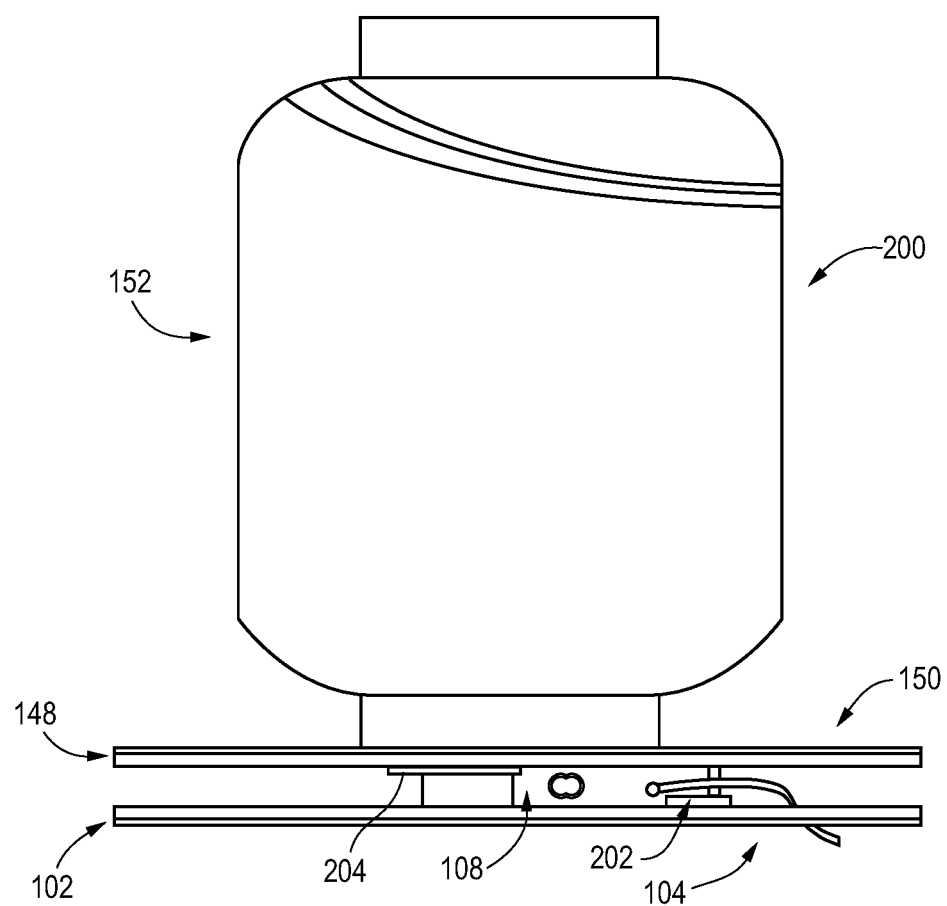
FIG. 7 shows a side view of a second embodiment of an exemplary weight measurement system.
Figure 8:
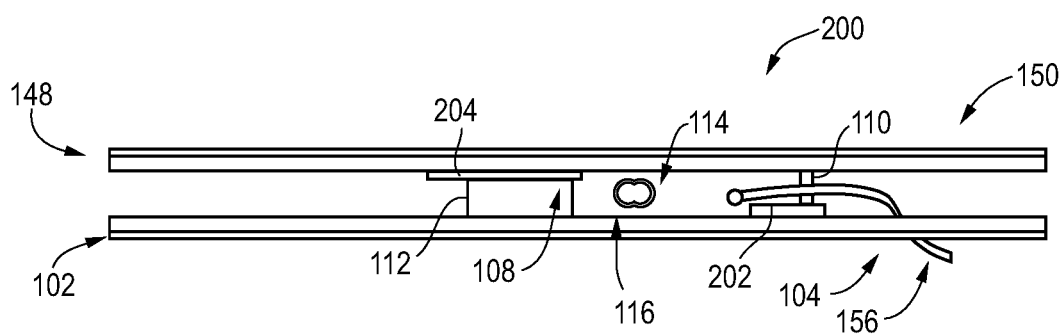
FIG. 8 shows a side view of an exemplary load cell of the weight measurement system of FIG. 7.

FIGS. 7-8 show a second embodiment of a system 200 for measuring the weight of material used in a textile manufacturing operation. The system 200 includes a lower profile configuration as compared to the system 100. As described previously with the system 100, the system 200 comprises a first segment, such as the first plate 102, which may also include the friction pad 104.

The system 200 may also include a bracket 202 that is positioned over the top of the first plate 102 and connected to the first plate 102. The bracket 202 may be adhesively connected to the first plate 102 or mechanically connected to the first plate 102 through screws, fasteners, bolts, nuts, or other means of mechanical securement. The material of the bracket 202 may be the same or different than the material of the first plate 102. The bracket 202 provides for a stable foundation and mounting of one segment of the load cell 108. The load cell 108 may comprise one of the types of load cells as previously described, including but not limited to a load button, ring, pancake low profile or other compression type load cell.

The first end portion 110 of the load cell 108 may be mounted, coupled or secured to the bracket 202 with one or more coupling elements, such as screws, fasteners, bolts, nuts or other means of mechanical securement. As shown in FIGS. 7-8, a portion of the bottom 116 of the load cell 108 may be mounted or coupled to the bracket 202.

As described previously with the system 100, the system 200 may also include a receiving surface that is adapted for receipt of the material to be measured by the load cell 108. The receiving surface of the system 200 may be a part of the load cell itself, or may be a distinct part coupled to the load cell such as the second plate 148, which may also include the friction pad 150, as explained above with respect to system 100.

When the system 200 includes the second plate 148, the system 200 may also include a bracket 204. The bracket 204 provides for coupling and/or securing the load cell 108 with the second plate 148. The material of the bracket 204 may be the same or different than the material of the second plate 148. The second end portion 112 of the load cell 108 may be coupled to the bracket 204 with one or more coupling elements, such as screws, fasteners, bolts, nuts or other means of mechanical securement. As shown in FIGS. 7-8, a portion of the top 114 of the load cell 108 may be mounted or coupled to the bracket 204.

In one embodiment, the second plate 148 may also include or be coupled to a shaft, rod, pole or other cylindrical element (not shown) that is positioned generally perpendicular to the second plate 148. The supportive cone of the yarn cone 152 or the bobbin may include a hollow center, and the yarn cone 152 or the bobbin may be positioned over the cylindrical element to minimize movement of the yarn cone 152 or the bobbin along or around the second plate 148 during the manufacturing process.

Figure 9:
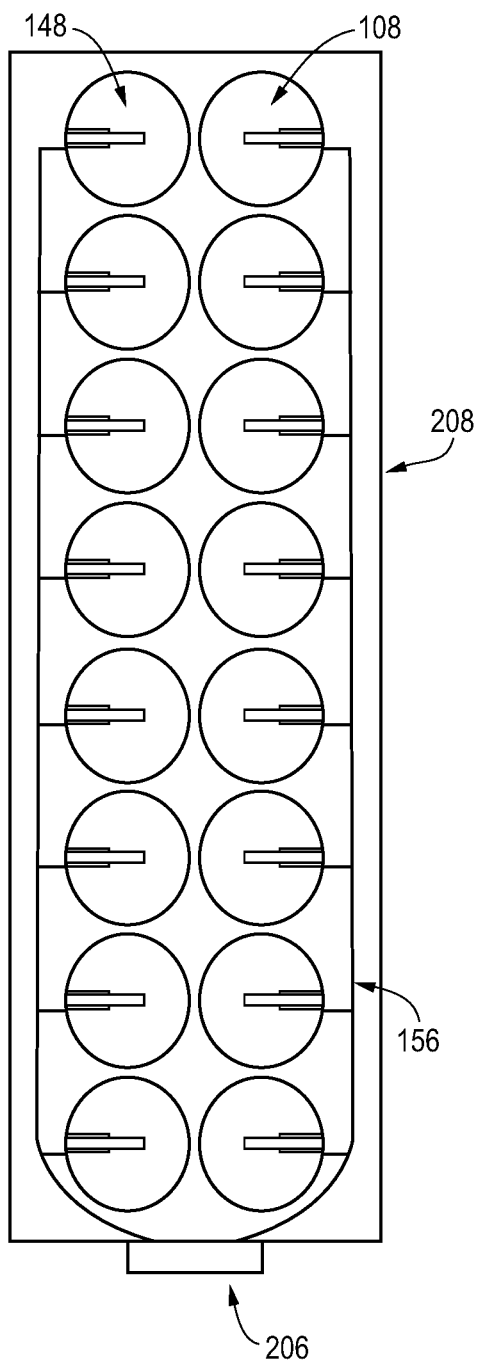
FIG. 9 shows a top view of a third embodiment of an exemplary weight measurement system comprising a plurality of load cells.

Referring to FIG. 9, in some embodiments, a plurality of load cells 108 may be positioned on a textile manufacturing machine, such as an industrial knitting machine that has a surface to accommodate a plurality of yarn cones 152. In the example of FIG. 9, a load cell 108 may be positioned underneath each yarn cone 152, such that one load cell 108 will correspond with one yarn cone 152. The plurality of load cells 108 may be in communication with a central computer 160 that provides the weight output of each yarn cone 152 on a textile manufacturing machine. If multiple textile manufacturing machines are used, such as in factories, and communicate with the central computer 160, the software may also identify the specific machine, the specific yarn cone 152, and the type of yarn on the yarn cone that is measured.

In the example of FIG. 9, the wires or electrical cables 156 of the load cells 108 may be connected to a common power source 206. The power source 206 may also include or be coupled to the amplifier 154 and/or the analog to digital converter 158 as previously described. The common power source 206 provides for a single source, for example, for load cells associated with each textile manufacturing machine to have power and communicate with the central computer 160.

As shown in FIG. 9, the plurality of load cells 108 may also be positioned over a cover, mat or pad 208. The cover 208 provides for a common base for the plurality of load cells 108 and to minimize movement of the plurality of load cells 108 along the textile manufacturing machine. The cover 208 also allows for ease of positioning and removal of the plurality of load cells 108 from a textile manufacturing machine. The cover 208 may comprise a rectangular or square shape and may extend around the plurality of load cells 108 to provide for an enclosure around the plurality of load cells 108. A second cover, mat or pad may also be positioned over the plurality of load cells 108 and coupled to the first cover 208 to encapsulate or otherwise enclose the plurality of load cells 108.

Advantageously, the present embodiments measure the weight of material, such as yarn, that is used during a textile manufacturing process. If such material is purchased in weight, and the present embodiments measure the weight of material used at desired benchmarks or intervals, then there is no need to convert length measurements into weight, which leads to simplified purchasing of the material.

As a further advantage, the present embodiments may significant reduce or eliminate incorrect calculations that may arise when converting measurements for length of material into projected measurements for weight of material used. Using yarn as an exemplary material, since the temperature and humidity of the air may significantly vary depending on where the textile manufacturing machine is located, yarn may shrink or stretch, which affects the length measurement of the amount of yarn used. As the length of the yarn varies, the density or linear density of the yarn may provide an inaccurate estimate regarding the weight of the yarn used, as the calculation does not take into account the temperature and humidity conditions. In the present embodiments, purchasers of yarn can have improved accurately identifying the amount of yarn necessary to purchase by weight for a given article or the amount of yarn used to make an article, leading to less material surplus or waste.

As another advantage, a user does not need to remove the yarn cone from the first plate to obtain a proper weight measurement of yarn used. Rather, physical user intervention is minimized or eliminated during the process.

As yet a further advantage, the weight measurements taken using the systems and methods described above may assist in determinations of what locations may be best for certain textile manufacturing operations. For example, an evaluation may be made regarding what factory can produce the most articles in a given amount of time with a certain weight of yarn, with temperature and humidity being monitored and taken into account.

As noted above, while exemplary references have been made to yarn, yarn cones, or weight of a yarn cone, it will be understood that materials other than yarn may be used in textile manufacturing processes and measured according to the foregoing description, and the above systems and methods are intended to cover any such variable materials.

It will be appreciated by those skilled in the art that changes could be made to the embodiments described above without departing from the broad inventive concept therefore. It is understood, therefore, that this invention is not limited to the particular embodiments disclosed, but it is intended to cover modifications within the spirit and scope of the present invention as defined by the claims.

The invention claimed is:

1. A system for measuring the weight of yarn used during a knitting process on a knitting machine, the knitting machine having a needle bed adapted to manipulate the yarn into a knit article, and wherein the weight measurement system is positioned upstream of the needle bed, the weight measurement system comprising: a first segment adapted to be stably positioned relative to a knitting machine; a block connected to the first segment; a load cell comprising a first end portion and a second end portion, wherein the first end portion of the load cell is coupled to the block; and a receiving surface associated with the load cell, wherein the receiving surface is adapted to receive a yarn cone containing the yarn manipulated by the needle bed, and the receiving surface is positioned at a location enabling the yarn to be weighed by the load cell before or during the knitting process.

2. The system of claim 1, wherein the first segment comprises a first plate distinct from the load cell.

3. The system of claim 2, further comprising a friction pad positioned on a base of the first plate.

4. The system of claim 1, wherein the receiving surface comprises a second plate distinct from the load cell, wherein the second plate is adapted to receive the material to be measured by the load cell.

5. The system of claim 1, further comprising a housing surrounding at least the second end portion of the load cell.

6. The system of claim 5, wherein the housing comprises a base, at least two side panels, and a cavity, wherein the second end portion of the load cell is positioned within the cavity and is coupled to the base of the housing.

7. The system of claim 6, wherein each of the at least two side panels comprises two sections, the first section comprises a first length and a first height, and the second section comprises a second length and extends from the first height of the first section and tapers toward the base of the housing to a second height smaller than the first height.

8. The system of claim 7, wherein the receiving surface comprises a second plate distinct from the load cell, wherein the second plate is positioned over the first sections of the at least two side panels of the housing.

9. The system of claim 1, wherein the load cell is coupled to an amplifier.

10. The system of claim 9, wherein the amplifier is coupled to an analog to digital converter, and wherein the analog to digital converter is coupled to a computer for recordation of the weight of the material measured by the load cell.

* * * * *